United States Patent
Arora et al.

(10) Patent No.: US 12,452,061 B2
(45) Date of Patent: *Oct. 21, 2025

(54) SYSTEM AND METHOD FOR DISTRIBUTED AND AUTHENTICATED PROVISIONING OF ENCRYPTED ELECTRONIC DATA

(71) Applicant: BANK OF AMERICA CORPORATION, Charlotte, NC (US)

(72) Inventors: Saurabh Arora, Gurugram (IN); Sandeep Kumar Chauhan, Hyderabad (IN); Bhagya Lakshmi Sudha Lavanya Mallidi, Hyderabad (IN); Puneetha Polasa, Telangana (IN); Sanchit Taggar, New Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 119 days.

This patent is subject to a terminal disclaimer.

(21) Appl. No.: 17/989,751

(22) Filed: Nov. 18, 2022

(65) Prior Publication Data

US 2024/0171397 A1    May 23, 2024

(51) Int. Cl.
*H04L 9/32*    (2006.01)
*G06F 21/56*   (2013.01)
*H04L 9/40*    (2022.01)
*H04L 47/83*   (2022.01)
(Continued)

(52) U.S. Cl.
CPC ............ *H04L 9/321* (2013.01); *G06F 21/566* (2013.01); *H04L 9/3297* (2013.01); *H04L 47/83* (2022.05); *H04L 63/0876* (2013.01); *H04L 63/1425* (2013.01); *H04L 67/568* (2022.05); *H04L 67/5681* (2022.05)

(58) Field of Classification Search
None
See application file for complete search history.

(56) References Cited

U.S. PATENT DOCUMENTS

| 5,712,989 | A | 1/1998 | Johnson |
| 5,884,300 | A | 3/1999 | Brockman |
| 7,136,832 | B2 | 11/2006 | Li |

(Continued)

OTHER PUBLICATIONS

IETF HTTP Working Group, HTTP/2 Frequently Asked Questions (Year: 2022).*

*Primary Examiner* — Pramila Parthasarathy
(74) *Attorney, Agent, or Firm* — Moore & Van Allen PLLC; Nicholas C. Russell

(57) ABSTRACT

A system is provided for distributed and authenticated provisioning of encrypted electronic data. In particular, the system may comprise an intelligent monitoring engine that may continuously monitor and log actions and/or requests executed by an endpoint device to identify one or more data request patterns associated with the endpoint device. Based on identifying the data request patterns, the system may transfer encrypted electronic data to the endpoint device for storage, where the encrypted electronic data may be configured with a time to live on the endpoint device. The system may further comprise an unauthorized activity monitor that may monitor the actions taken by the endpoint device to detect potentially unauthorized activity involving the endpoint device. If no unauthorized activity is detected, the system may permit the endpoint device to decrypt the encrypted electronic data to be presented to a user.

14 Claims, 4 Drawing Sheets

(51) Int. Cl.
*H04L 67/568* (2022.01)
*H04L 67/5681* (2022.01)

(56) References Cited

U.S. PATENT DOCUMENTS

| | | |
|---|---|---|
| 7,262,685 B2 | 8/2007 | Bastian, II |
| 7,543,744 B2 | 6/2009 | Hart |
| 8,179,261 B2 | 5/2012 | Frabasile |
| 10,445,694 B2 | 10/2019 | Fisher |
| 10,495,764 B2 | 12/2019 | Bastian, II |
| 10,861,086 B2 | 12/2020 | Glaser |
| 10,951,626 B2 | 3/2021 | Simons |
| 11,126,802 B2 | 9/2021 | Hussain |
| 11,361,292 B2 | 6/2022 | Rathod |
| 11,411,968 B1 * | 8/2022 | Banerjee ............. H04L 63/1425 |
| 2002/0099567 A1 | 7/2002 | Joao |
| 2002/0128932 A1 | 9/2002 | Yung |
| 2003/0216969 A1 | 11/2003 | Bauer |
| 2003/0222762 A1 | 12/2003 | Beigl |
| 2004/0093288 A1 | 5/2004 | Strothmann |
| 2005/0131785 A1 | 6/2005 | Yap |
| 2011/0320546 A1 * | 12/2011 | Holden ................. H04L 65/403 709/204 |
| 2013/0066936 A1 * | 3/2013 | Krishnan ............ H04L 67/5681 709/201 |
| 2017/0214701 A1 * | 7/2017 | Hasan ................. H04L 63/1433 |
| 2017/0324807 A1 * | 11/2017 | Gu ......................... H04L 67/561 |
| 2019/0272498 A1 | 9/2019 | Swafford |
| 2020/0065751 A1 | 2/2020 | Waters |
| 2020/0372823 A1 * | 11/2020 | Edwards ................ G09B 19/18 |

\* cited by examiner

SYSTEM AND METHOD FOR DISTRIBUTED AND AUTHENTICATED PROVISIONING OF ENCRYPTED ELECTRONIC DATA

FIELD OF THE INVENTION

The present invention embraces a system and method for distributed and authenticated provisioning of encrypted electronic data.

BACKGROUND

There is a need for a secure way to provision electronic data to endpoint devices.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for distributed and authenticated provisioning of encrypted electronic data. In particular, the system may comprise an intelligent monitoring engine that may continuously monitor and log actions and/or requests executed by an endpoint device to identify one or more data request patterns associated with the endpoint device. Based on identifying the data request patterns, the system may transfer encrypted electronic data to the endpoint device for storage, where the encrypted electronic data may be configured with a time to live on the endpoint device. The system may further comprise an unauthorized activity monitor that may monitor the actions taken by the endpoint device to detect potentially unauthorized activity involving the endpoint device. If no unauthorized activity is detected, the system may permit the endpoint device to decrypt the encrypted electronic data to be presented to a user. In this way, the system may provide a secure way to provision encrypted electronic data.

Accordingly, embodiments of the present disclosure provide a system for distributed and authenticated provisioning of encrypted electronic data, the system comprising at least one non-transitory storage device; and at least one processor coupled to the at least one non-transitory storage device, wherein the at least one processor is configured to continuously monitor, using an intelligent monitoring engine, one or more actions of an endpoint device, the one or more actions comprising one or more data requests submitted using the endpoint device; identify, using a machine learning module, one or more access patterns associated with the endpoint device from the one or more data requests and metadata associated with the one or more data requests; based on the one or more access patterns, transmit an encrypted data set to the endpoint device; identify, using an unauthorized activity monitor, a baseline for authorized activity on the endpoint device based on the one or more access patterns; and based on the baseline for authorized activity, authenticate a user associated with the endpoint device for accessing the encrypted data set on the endpoint device.

In some embodiments, identifying the one or more access patterns further comprises analyzing metadata associated with the one or more data requests, wherein the metadata comprises timeframes associated with the one or more data requests and types of data requested in the one or more data requests.

In some embodiments, transmitting the encrypted data set to the endpoint device comprises, based on the timeframes associated with the one or more data requests, transmitting the encrypted data before a predicted access time of the endpoint device.

In some embodiments, transmitting the encrypted data set to the endpoint device comprises transmitting the encrypted data at a time in which a computing load of a server associated with the encrypted data set is submaximal.

In some embodiments, authenticating the user further comprises detecting that a recent activity associated with the endpoint device is consistent with the baseline for authorized activity; and authorizing the endpoint device to decrypt the encrypted data set.

In some embodiments, authenticating the user further comprises detecting that a recent activity associated with the endpoint device deviates from the baseline for authorized activity; determining that the recent activity is unauthorized activity; and blocking the endpoint device from executing decryption logic to decrypt the encrypted data set.

In some embodiments, transmitting the encrypted data set comprises executing a data sync with a server associated with the encrypted data set.

Embodiments of the present disclosure also provide a computer program product for distributed and authenticated provisioning of encrypted electronic data, the computer program product comprising a non-transitory computer-readable medium comprising code causing an apparatus to continuously monitoring, using an intelligent monitoring engine, one or more actions of an endpoint device, the one or more actions comprising one or more data requests submitted using the endpoint device; identifying, using a machine learning module, one or more access patterns associated with the endpoint device from the one or more data requests and metadata associated with the one or more data requests; based on the one or more access patterns, transmitting an encrypted data set to the endpoint device; identifying, using an unauthorized activity monitor, a baseline for authorized activity on the endpoint device based on the one or more access patterns; and based on the baseline for authorized activity, authenticating a user associated with the endpoint device for accessing the encrypted data set on the endpoint device.

In some embodiments, identifying the one or more access patterns further comprises analyzing metadata associated with the one or more data requests, wherein the metadata comprises timeframes associated with the one or more data requests and types of data requested in the one or more data requests.

In some embodiments, transmitting the encrypted data set to the endpoint device comprises, based on the timeframes associated with the one or more data requests, transmitting the encrypted data before a predicted access time of the endpoint device.

In some embodiments, transmitting the encrypted data set to the endpoint device comprises transmitting the encrypted data at a time in which a computing load of a server associated with the encrypted data set is submaximal.

In some embodiments, authenticating the user further comprises detecting that a recent activity associated with the endpoint device is consistent with the baseline for authorized activity; and authorizing the endpoint device to decrypt the encrypted data set.

In some embodiments, authenticating the user further comprises detecting that a recent activity associated with the endpoint device deviates from the baseline for authorized activity; determining that the recent activity is unauthorized activity; and blocking the endpoint device from executing decryption logic to decrypt the encrypted data set.

Embodiments of the present disclosure also provide a computer-implemented method for distributed and authenticated provisioning of encrypted electronic data, the computer-implemented method comprising continuously monitoring, using an intelligent monitoring engine, one or more actions of an endpoint device, the one or more actions comprising one or more data requests submitted using the endpoint device; identifying, using a machine learning module, one or more access patterns associated with the endpoint device from the one or more data requests and metadata associated with the one or more data requests; based on the one or more access patterns, transmitting an encrypted data set to the endpoint device; identifying, using an unauthorized activity monitor, a baseline for authorized activity on the endpoint device based on the one or more access patterns; and based on the baseline for authorized activity, authenticating a user associated with the endpoint device for accessing the encrypted data set on the endpoint device.

In some embodiments, identifying the one or more access patterns further comprises analyzing metadata associated with the one or more data requests, wherein the metadata comprises timeframes associated with the one or more data requests and types of data requested in the one or more data requests.

In some embodiments, transmitting the encrypted data set to the endpoint device comprises, based on the timeframes associated with the one or more data requests, transmitting the encrypted data before a predicted access time of the endpoint device.

In some embodiments, transmitting the encrypted data set to the endpoint device comprises transmitting the encrypted data at a time in which a computing load of a server associated with the encrypted data set is submaximal.

In some embodiments, authenticating the user further comprises detecting that a recent activity associated with the endpoint device is consistent with the baseline for authorized activity; and authorizing the endpoint device to decrypt the encrypted data set.

In some embodiments, authenticating the user further comprises detecting that a recent activity associated with the endpoint device deviates from the baseline for authorized activity; determining that the recent activity is unauthorized activity; and blocking the endpoint device from executing decryption logic to decrypt the encrypted data set.

In some embodiments, transmitting the encrypted data set comprises executing a data sync with a server associated with the encrypted data set.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
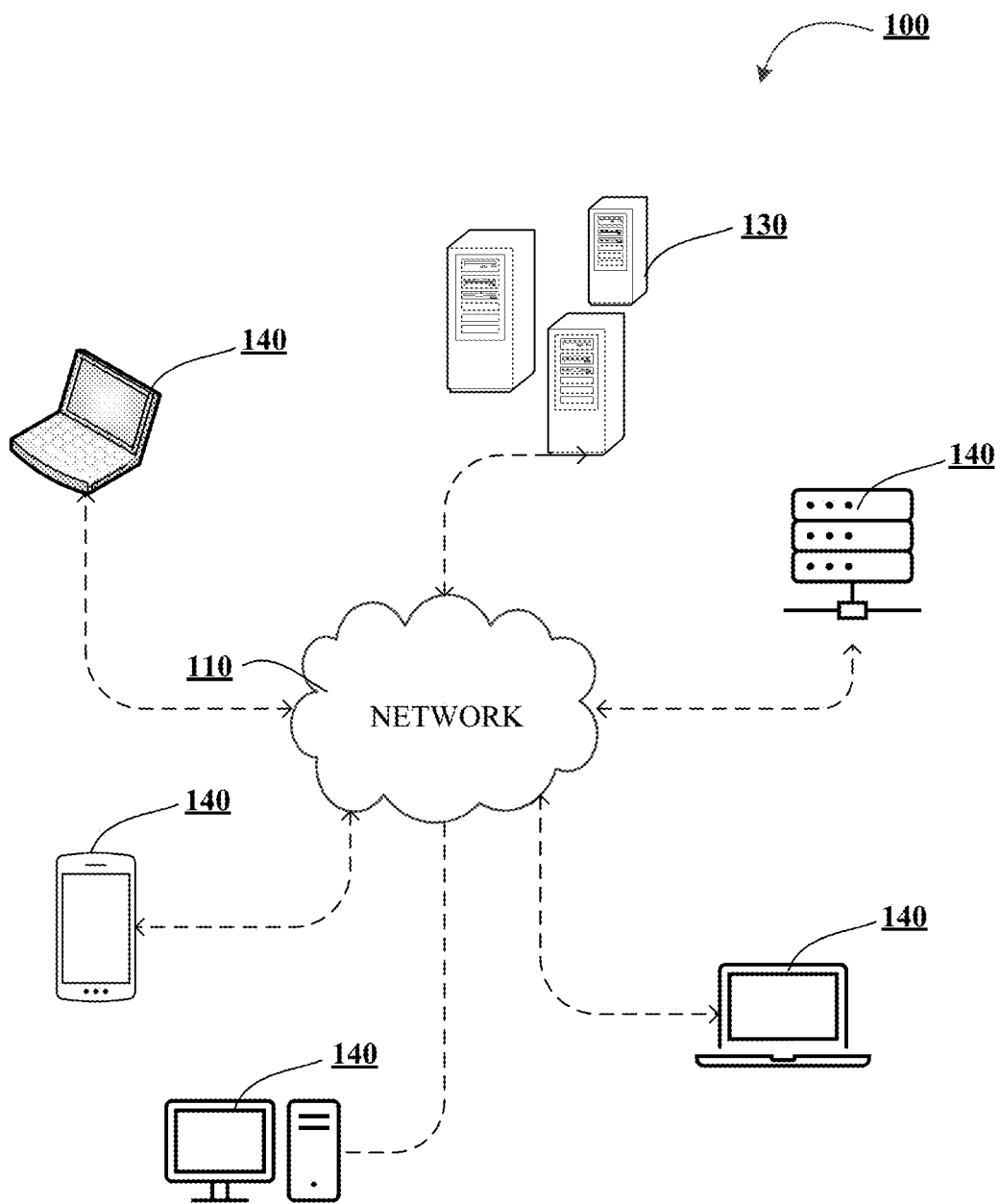
Figure 1B:
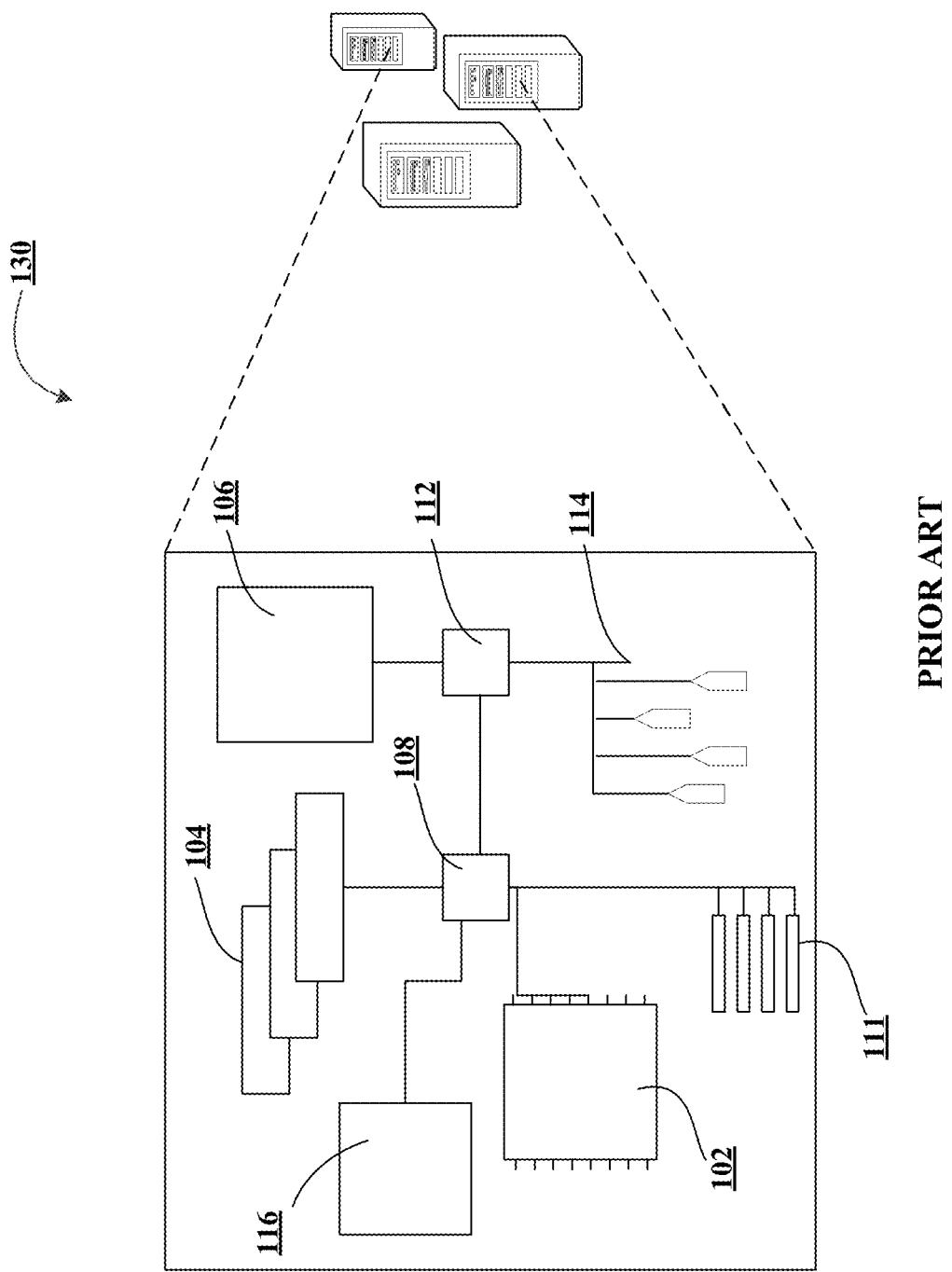
Figure 1C:
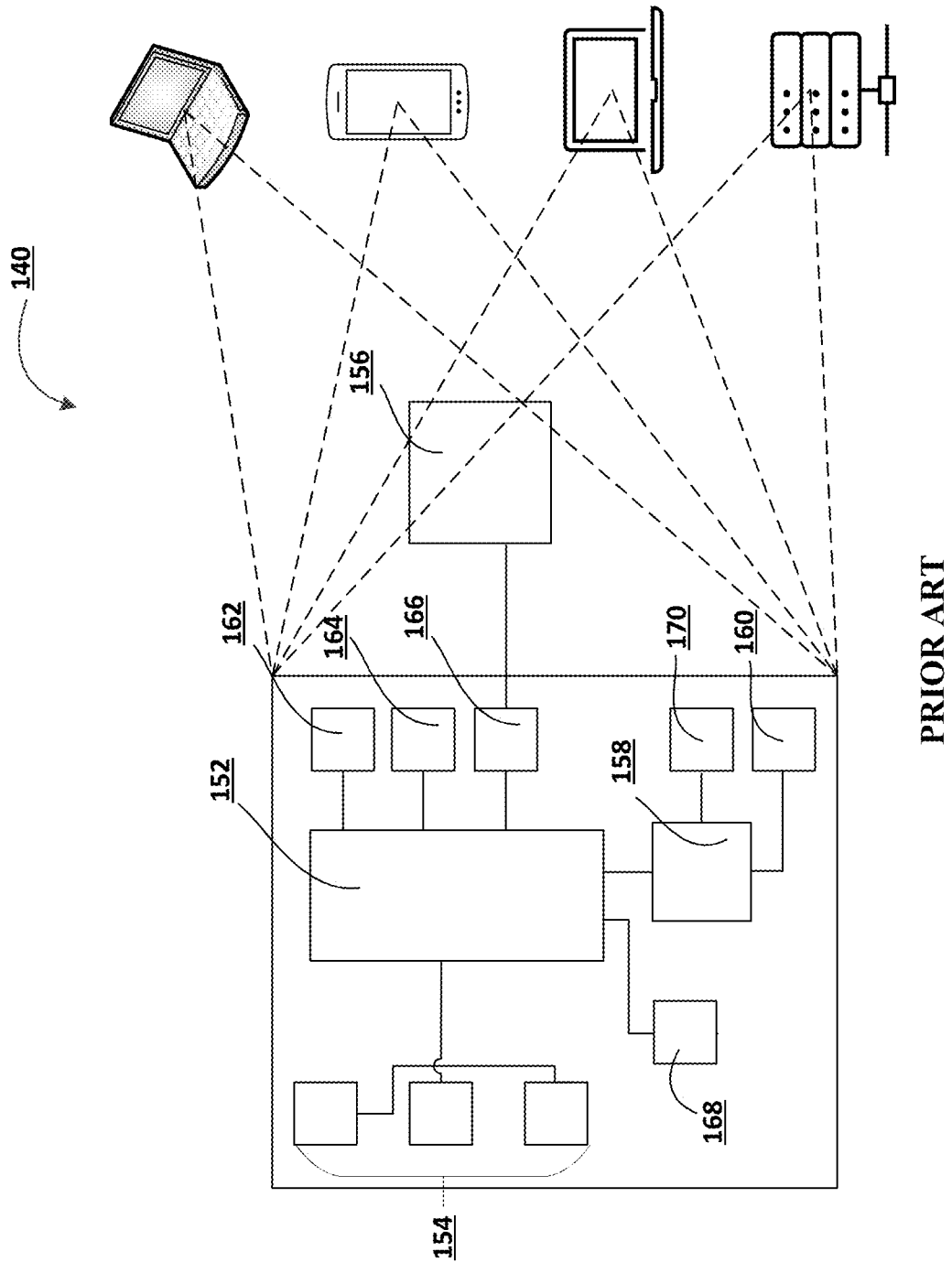
Figure 2:
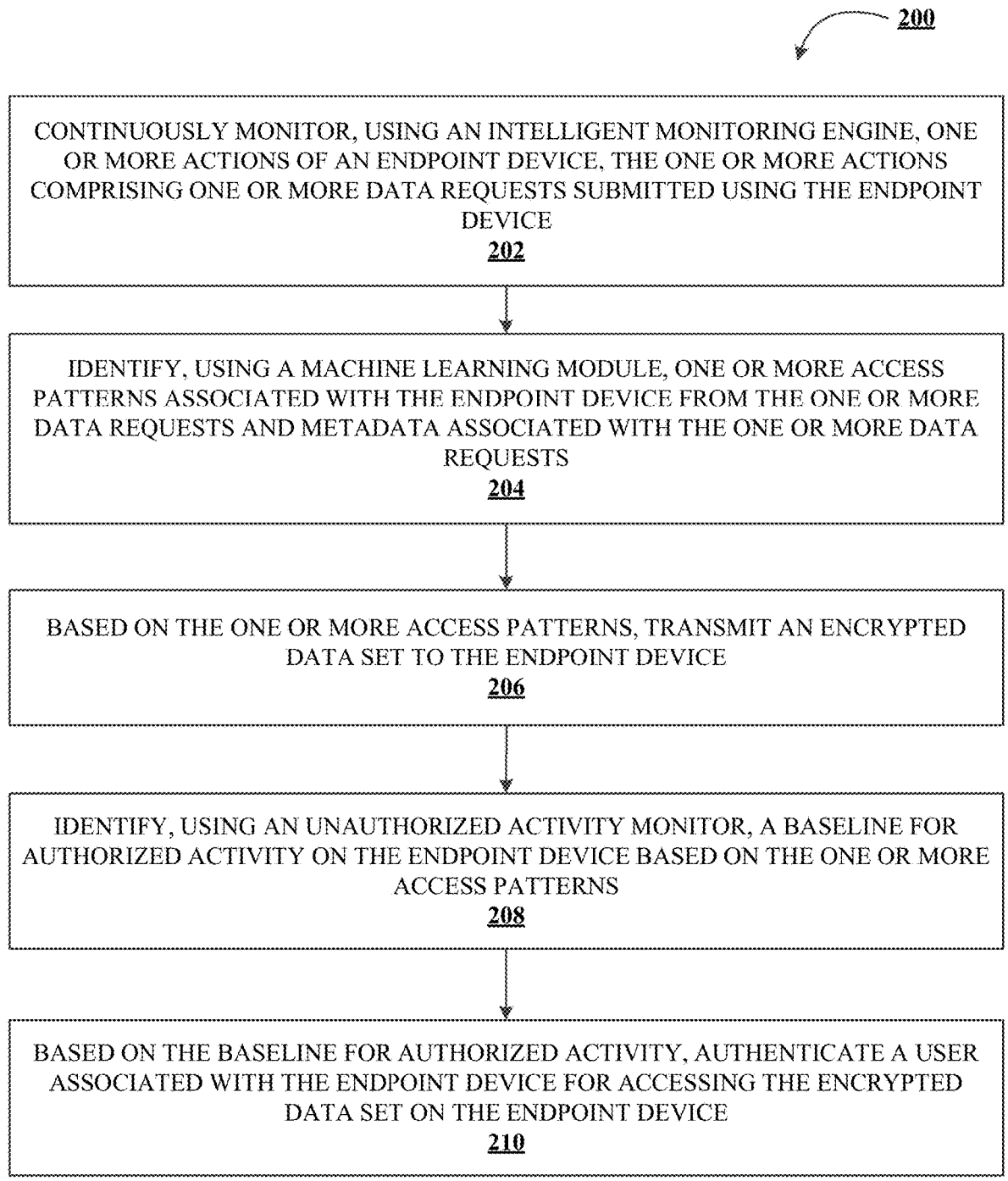

Having thus described embodiments of the invention in general terms, reference will now be made the accompanying drawings, wherein:

FIGS. 1A-1C illustrates technical components of an exemplary distributed computing environment for the system for distributed and authenticated provisioning of encrypted electronic data, in accordance with an embodiment of the present disclosure;

FIG. 2 illustrates a process flow for distributed and authenticated provisioning of encrypted electronic data, in accordance with an embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface ("GUI") or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, personalized characteristic information (e.g., iris recognition, retina scans, fingerprints, and/or the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may generally refer to physical or virtual objects that may be used to accomplish the entity's objectives. In this regard, the resources may include technology related hardware devices (e.g., desktop computers, servers, laptop computers, computer components, routers, hubs, switches, and/or the like), software (e.g., applications, libraries, data files, and/or the like), or computing resources such as processing power, memory allocation, cache space, storage space, data files, network connections and/or bandwidth, electrical power, input/output functions, and the like, or data files (e.g., document files, media files, system files, and/or the like).

With the proliferation of internet technology, an entity's network environment may face an ever-increasing demand for providing data in an expedient and reliable manner. As a result, the computing load experienced during peak times entity's servers may place the computing resources of the network, which may include networking bandwidth, processing power, memory space, and/or the like, which may in turn lead to processing delays, network congestion, dropped packets, and/or the like. Accordingly, there is a need more an efficient and secure way to provision electronic data.

To address the foregoing among other scenarios, embodiments of the present disclosure provide a system for distributed and authenticated provisioning of encrypted electronic data. The system may leverage the computing capabilities of endpoint devices to serve user requests for data by storing at least a portion of the requested data in an encrypted form on each of the endpoint devices. To this end, the system may comprise an intelligent monitoring engine that may continuously monitor the actions and/or behavior of the endpoint device. In particular, the intelligent monitoring engine may monitor and log the interactions of the endpoint device with the entity's networks and/or servers. For example, the intelligent monitoring engine may monitor the data requests submitted by the endpoint device to the entity's servers and log the metadata associated with the data requests, where the metadata may include the type and/or content of the data requested, a timestamp for the data request, the data source associated with the data requests, and/or the like.

Based on the data requests and metadata associated with the data requests, the intelligent monitoring engine may (e.g., using an artificial intelligence module with machine learning capabilities) detect and analyze behavior patterns of the endpoint device to determine an intent of the user for accessing the server. For example, based on the data requests submitted by the endpoint device, the intelligent monitoring engine may determine that the endpoint device accesses the entity's servers to request a particular type of data and a particular time or time interval. Based on detecting the pattern, the system may generate a prediction associated with the endpoint device for future data requests submitted by the endpoint device (e.g., the system may determine that the user is likely to submit a data request for specific types of data at certain specific times).

Based on the predictions, the system may encrypt a set of data associated with the prediction (e.g., the data that is likely to be requested by the user through the endpoint device in the future) and transmit the encrypted set of data to the endpoint device to be stored on the endpoint device. In some embodiments, the system may intelligently transfer the encrypted set of data to the endpoint device based on detecting a period of low computing resource usage of the server (e.g., at an "off-peak" time in which the server load is relatively low).

Subsequently, the endpoint device may receive an input from the user, where the input may include a request for a particular set of data. If the requested data is found within the encrypted data stored on the endpoint device, the endpoint device may decrypt the encrypted data and provide the requested data to the user (e.g., by presenting the data within a graphical interface on the display of the endpoint device). In this way, the system may be able to distribute the computing load associated with serving data requests to the endpoint device in the case of certain historically commonly requested types of data by the user, which in turn relieves the strain on computing resources on the entity's servers during times of peak network traffic.

In some embodiments, the system may further comprise an unauthorized activity monitor that may continuously monitor the activity of the endpoint device to determine whether any unauthorized activity is taking place using the endpoint device. In this regard, the unauthorized activity monitor may monitor information associated with the endpoint device, such as location data associated with the endpoint device and/or actions executed using the endpoint device, transaction data, timeframes for accessing the entity's servers and/or application within the endpoint device, and/or the like. Based on the historical activity associated with the endpoint device, the system may use a machine learning model to establish a baseline of normal activity for the endpoint device. Accordingly, if the unauthorized activity monitor detects a departure from the baseline established by the machine learning model (e.g., the endpoint device is located in an unusual location, is used to execute unusual activities, is accessed during unusual times or timeframes, and/or the like), the unauthorized activity monitor may determine that the endpoint device has been compromised (e.g., by an unauthorized user). In such an embodiment, the system may block the encrypted data stored on the endpoint device from being decrypted. In some embodiments, the system may execute one or more additional remediation actions (e.g., triggering an expiration of the encrypted data, causing the encrypted data to be deleted from the endpoint device). If, on the other hand, the unauthorized activity monitor detects that the activity associated with the endpoint device is consistent with the baseline, the unauthorized activity monitor may allow the encrypted data to be decrypted to be viewed by the user. In this way, the system provides a secure and computing resource efficient way to distributed computing load in response to data requests from endpoint devices.

An exemplary embodiment is described as follows for illustrative purposes and is not intended to restrict the scope of the disclosure provided herein. In one embodiment, a user may be a customer of an entity such as a financial institution. Accordingly, the user may routinely request to obtain transaction history information from an application installed on an endpoint device operated by the user. The entity's systems may include an intelligent monitoring engine that may monitor the requests submitted by the endpoint device and identify the data to be stored on the endpoint device based on the user's access patterns. For instance, the intelligent monitoring engine may identify the transaction history information as data that is eligible to be stored on the endpoint device based on detecting that the user consistently requests such data at regular intervals (e.g., daily in the evenings). Subsequently, the system may encrypt the transaction history information associated with the user and transmit the encrypted data to the endpoint device during a time in which the server load is less than full capacity (e.g., an off-peak time). Accordingly, when the user submits another request for the transaction history information, the endpoint device may decrypt the encrypted transaction history data stored on the endpoint device and present the decrypted data to the user. In this regard, the system may transmit a decryption key to the endpoint device for use in decrypting the encrypted data. In other embodiments, the system may authorize the endpoint device to execute the decryption logic using a decryption key stored on the endpoint device. The encrypted data may be associated with a time-to-live ("TTL") that specifies a time duration for storing the encrypted data on the endpoint device. Once the time duration elapses, the encrypted data may be automatically deleted from the endpoint device. In some embodiments, the unauthorized activity monitor may further monitor the user's access patterns and/or information about the endpoint device to determine whether the endpoint device has been compromised. For instance, if the endpoint device logs in from an unusual location and/or IP address/network, the unauthorized activity monitor may flag the endpoint device as being potentially compromised and thus prevent the encrypted data from being decrypted (e.g., by blocking transfer of the decryption key to the endpoint device).

The system as described herein provides a number of technological benefits over conventional data provisioning solutions. In particular, by intelligently distributing computing loads to the endpoint devices, the endpoint devices may serve as nodes to serve user requests, which in turn allows the system as a whole to save computing resources such as processing power, networking bandwidth, data storage space, memory allocation space, I/O calls, and/or the like during times of peak network traffic. Furthermore, by encrypting the data stored on the endpoint device and monitoring endpoint device activity using the unauthorized activity monitor, the system may ensure the security of the data stored on the endpoint device.

FIGS. 1A-1C illustrate technical components of an exemplary distributed computing environment 100 for the system for distributed and authenticated provisioning of encrypted electronic data. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for distributed and authenticated provisioning of encrypted electronic data, in accordance with an embodiment of the present disclosure. The process begins at block 202, where the system continuously monitors, using an intelligent monitoring engine, one or more actions of an endpoint device, the one or more actions comprising one or more data requests submitted using the endpoint device. In this regard, the system may identify the "read" operations requested by the endpoint device (e.g., a request to pull data from the entity's servers). In addition to the data requests themselves, the system may further track certain metadata associated with such requests, such as the timeframes or timestamps associated with the data requests, the types of data requested by the endpoint device, actions or functions accessed within a user application installed on the endpoint device, and/or the like.

The process continues to block 204, where the system identifies, using a machine learning module, one or more access patterns associated with the endpoint device from the one or more data requests and metadata associated with the one or more data requests. Based on the activity monitored by the intelligent monitoring engine, the system may identify the one or more access patterns to determine the intent or purpose of the user for accessing the functions of the system and/or the user application. Based on identifying the intent of the user, the system may then determine whether the functions requested by the user may be executed by the endpoint device. For instance, the system may determine that certain functions do not require the endpoint device to make a server call to execute the requested function (e.g., serving or presenting data). Accordingly, the system may intelligently offload the processing of the function (e.g., serving the data request) to the endpoint device based on the access patterns associated with the endpoint device.

Upon determining that certain data requests may be fulfilled by the endpoint device, the system may proactively push specific types of data to the endpoint device based on the types of data frequently requested by the user and/or the timeframes at which the user requests such data. In an exemplary embodiment, the user of the endpoint device may be a customer who may hold a resource account with an entity such as a financial institution. In such an embodiment, the system may detect that the user logs onto the user application on the endpoint device multiple times a day at certain predictable timeframes (e.g., 12:00 PM, 2:00 PM, and 5:00 PM) to request a specific type of data (e.g., information on the amount of resources within the resource account of the user, a transaction history associated with the resource account, and/or the like). Accordingly, the system may determine that a certain data set (e.g., a data set including the information on the resource account and/or the transaction history associated with the resource account) may be transmitted and stored on the endpoint device such that the requested data may be served from the endpoint device without making a call to the server.

The process continues to block 206, where the system based on the one or more access patterns, transmits an encrypted data set to the endpoint device. The encrypted data set may include the data that is typically or frequently requested by the user (e.g., a transaction history associated with the resource account). Accordingly, the data set may be transmitted to the endpoint device at a time interval in which the computing load of the server associated with the data set is submaximal (e.g., at an off-peak timeframe). In some embodiments, the system may also select the time interval to occur before the predicted access times of the endpoint device. For instance, if the user typically requests the data at 5:00 PM, the system may transmit the encrypted data set before 5:00 PM to ensure that the user receives an updated data set. Accordingly, in some embodiments, transmitting the encrypted data set may comprise executing a data sync with the server to update the encrypted data set. In some embodiments, the system may further read device metadata associated with the endpoint device (e.g., determining whether the endpoint device is idle by reading processing load, networking activity, memory allocation, and/or the like), and transmit the encrypted data set at a time interval in which the endpoint device is idle.

The process continues to block 208, where the system identifies, using an unauthorized activity monitor, a baseline for authorized activity on the endpoint device based on the one or more access patterns. In this regard, the baseline for authorized activity may be established based on historical data associated with the user (e.g., historical transaction data such as transaction recipients, transaction amounts, and/or transaction types, location data, and/or the like) information provided by an authenticated user (e.g., user-specific information such as an address). Accordingly, detecting unusual activity may comprise detecting a deviation from the baseline for authorized activity, where such unusual activity may include logging in from the endpoint device from an unusual location, requesting an unusually large transaction to an unknown recipient, and/or the like.

The process continues to block 210, where the system based on the baseline for authorized activity, authenticates a user associated with the endpoint device for accessing the encrypted data set on the endpoint device. The authentication of the user may be tied to the decryption of the encrypted data set on the endpoint device such that decryption is only possible once the user has been authenticated. Accordingly, in such embodiments, authenticating the user may comprise detecting that a recent activity associated with the endpoint device is consistent with the baseline for authorized activity (e.g., the endpoint device has been accessed from predictable geographic locations, the recent transaction history is consistent with past transactions, and/or the like). Based on detecting that the recent activity is consistent with the baseline, the system may authorize the endpoint device to decrypt the encrypted data set to be presented on the display of the endpoint device. However, in other embodiments, authenticating the user may comprise detecting that the recent activity deviates from the baseline for authorized activity (e.g., by using a machine learning based threshold for the acceptable deviation from the baseline) and, based on detecting that the recent activity deviates from the baseline, blocking the endpoint device from executing the decryption logic to decrypt the encrypted data set. In this way, the system may increase the security of the requested data by ensuring that the data is inaccessible to unauthorized users.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for distributed and authenticated provisioning of encrypted electronic data, the system comprising:
   at least one non-transitory storage device; and
   at least one processor coupled to the at least one non-transitory storage device, wherein the at least one processor is configured to:
   continuously monitor, using an intelligent monitoring engine, one or more actions of an endpoint device, the one or more actions comprising one or more data requests submitted using the endpoint device;
   identify, using a machine learning module, one or more access patterns associated with the endpoint device from the one or more data requests and metadata associated with the one or more data requests, wherein identifying one or more access patterns further comprises offloading processing of a function to the endpoint device based on the one or more access patterns identified and pushing specific types of data to the endpoint device based on the types of data frequently requested by a user and timeframes at which the user requests such data, wherein the machine learning module is configured to establish a baseline of authorized activity for the endpoint device, and wherein the machine learning module is configured to analyze historical activity associated with the endpoint device to establish the baseline of authorized activity;

based on the one or more access patterns, transmit an encrypted data set to the endpoint device, wherein transmitting the encrypted data set to the endpoint device comprises transmitting the encrypted data at a time in which a computing load of a server associated with the encrypted data set is submaximal and at a time in which the endpoint device is idle, and wherein transmitting the encrypted data set to the endpoint device comprises, based on the timeframes associated with the one or more data requests, transmitting the encrypted data before a predicted access time of the endpoint device;

identify the baseline for authorized activity on the endpoint device based on the one or more access patterns; and based on the baseline for authorized activity, authenticate the user associated with the endpoint device for accessing the encrypted data set on the endpoint device, wherein authenticating the user further comprises detecting, via an unauthorized activity monitor, that a recent activity associated with the endpoint device deviates from the baseline for authorized activity, determining that the recent activity is unauthorized activity, and blocking the endpoint device from executing decryption logic to decrypt the encrypted data set to ensure that data of the encrypted data set is inaccessible to unauthorized users.

2. The system of claim 1, wherein identifying the one or more access patterns further comprises analyzing metadata associated with the one or more data requests, wherein the metadata comprises timeframes associated with the one or more data requests and types of data requested in the one or more data requests.

3. The system of claim 1, wherein authenticating the user further comprises:
    detecting that a recent activity associated with the endpoint device is consistent with the baseline for authorized activity; and
    authorizing the endpoint device to decrypt the encrypted data set.

4. The system of claim 1, wherein transmitting the encrypted data set comprises executing a data sync with a server associated with the encrypted data set.

5. The system of claim 1, wherein the unauthorized activity monitor is configured to monitor information associated with the endpoint device comprising location data, actions executed using the endpoint device, and transaction data, to detect departures from the baseline of authorized activity.

6. A computer program product for distributed and authenticated provisioning of encrypted electronic data, the computer program product comprising a non-transitory computer-readable medium comprising code causing an apparatus to:
    continuously monitoring, using an intelligent monitoring engine, one or more actions of an endpoint device, the one or more actions comprising one or more data requests submitted using the endpoint device;
    identifying, using a machine learning module, one or more access patterns associated with the endpoint device from the one or more data requests and metadata associated with the one or more data requests, wherein identifying one or more access patterns further comprises offloading processing of a function to the endpoint device based on the one or more access patterns identified and pushing specific types of data to the endpoint device based on the types of data frequently requested by a user and timeframes at which the user requests such data, wherein the machine learning module is configured to establish a baseline of authorized activity for the endpoint device, and wherein the machine learning module is configured to analyze historical activity associated with the endpoint device to establish the baseline of authorized activity;

based on the one or more access patterns, transmitting an encrypted data set to the endpoint device, wherein transmitting the encrypted data set to the endpoint device comprises transmitting the encrypted data at a time in which a computing load of a server associated with the encrypted data set is submaximal and at a time in which the endpoint device is idle, and wherein transmitting the encrypted data set to the endpoint device comprises, based on the timeframes associated with the one or more data requests, transmitting the encrypted data before a predicted access time of the endpoint device;

identifying the baseline for authorized activity on the endpoint device based on the one or more access patterns; and based on the baseline for authorized activity, authenticating the user associated with the endpoint device for accessing the encrypted data set on the endpoint device, wherein authenticating the user further comprises detecting, via an unauthorized activity monitor, that a recent activity associated with the endpoint device deviates from the baseline for authorized activity, determining that the recent activity is unauthorized activity, and blocking the endpoint device from executing decryption logic to decrypt the encrypted data set to ensure that data of the encrypted data set is inaccessible to unauthorized users.

7. The computer program product of claim 6, wherein identifying the one or more access patterns further comprises analyzing metadata associated with the one or more data requests, wherein the metadata comprises timeframes associated with the one or more data requests and types of data requested in the one or more data requests.

8. The computer program product of claim 6, wherein authenticating the user further comprises:
    detecting that a recent activity associated with the endpoint device is consistent with the baseline for authorized activity; and
    authorizing the endpoint device to decrypt the encrypted data set.

9. The computer program product of claim 6, wherein the unauthorized activity monitor is configured to monitor information associated with the endpoint device comprising location data, actions executed using the endpoint device, and transaction data, to detect departures from the baseline of authorized activity.

10. A computer-implemented method for distributed and authenticated provisioning of encrypted electronic data, the computer-implemented method comprising:
    continuously monitoring, using an intelligent monitoring engine, one or more actions of an endpoint device, the one or more actions comprising one or more data requests submitted using the endpoint device;

identifying, using a machine learning module, one or more access patterns associated with the endpoint device from the one or more data requests and metadata associated with the one or more data requests, wherein identifying one or more access patterns further comprises offloading processing of a function to the endpoint device based on the one or more access patterns identified and pushing specific types of data to the endpoint device based on the types of data frequently requested by a user and timeframes at which the user requests such data, wherein the machine learning module is configured to establish a baseline of authorized activity for the endpoint device, and wherein the machine learning module is configured to analyze historical activity associated with the endpoint device to establish the baseline of authorized activity;

based on the one or more access patterns, transmitting an encrypted data set to the endpoint device, wherein transmitting the encrypted data set to the endpoint device comprises transmitting the encrypted data at a time in which a computing load of a server associated with the encrypted data set is submaximal and at a time in which the endpoint device is idle, and wherein transmitting the encrypted data set to the endpoint device comprises, based on the timeframes associated with the one or more data requests, transmitting the encrypted data before a predicted access time of the endpoint device;

identifying the baseline for authorized activity on the endpoint device based on the one or more access patterns; and based on the baseline for authorized activity, authenticating the user associated with the endpoint device for accessing the encrypted data set on the endpoint device, wherein authenticating the user further comprises detecting, via an unauthorized activity monitor, that a recent activity associated with the endpoint device deviates from the baseline for authorized activity, determining that the recent activity is unauthorized activity, and blocking the endpoint device from executing decryption logic to decrypt the encrypted data set to ensure that data of the encrypted data set is inaccessible to unauthorized users.

11. The computer-implemented method of claim 10, wherein identifying the one or more access patterns further comprises analyzing metadata associated with the one or more data requests, wherein the metadata comprises timeframes associated with the one or more data requests and types of data requested in the one or more data requests.

12. The computer-implemented method of claim 10, wherein authenticating the user further comprises:
   detecting that a recent activity associated with the endpoint device is consistent with the baseline for authorized activity; and
   authorizing the endpoint device to decrypt the encrypted data set.

13. The computer-implemented method of claim 10, wherein transmitting the encrypted data set comprises executing a data sync with a server associated with the encrypted data set.

14. The computer-implemented method of claim 10, wherein the unauthorized activity monitor is configured to monitor information associated with the endpoint device comprising location data, actions executed using the endpoint device, and transaction data, to detect departures from the baseline of authorized activity.

* * * * *